(12) United States Patent
Fletcher et al.

(10) Patent No.: US 6,663,336 B2
(45) Date of Patent: Dec. 16, 2003

(54) TROUGH LIFTING MECHANISM

(75) Inventors: Jack Fletcher, Sidney, OH (US); Donald Boyd, Sidney, OH (US); Michael Hayden, Sidney, OH (US)

(73) Assignee: Shaffer Manufacturing Corporation, Sidney, OH (US)

(*) Notice: Subject to any disclaimer, the term of this patent is extended or adjusted under 35 U.S.C. 154(b) by 1 day.

(21) Appl. No.: 09/849,661

(22) Filed: May 4, 2001

(65) Prior Publication Data

US 2001/0027725 A1 Oct. 11, 2001

Related U.S. Application Data

(63) Continuation of application No. 09/418,789, filed on Oct. 15, 1999, now Pat. No. 6,238,165.

(51) Int. Cl.$^7$ ................................................. B65G 65/23
(52) U.S. Cl. ....................................... 414/422; 414/598
(58) Field of Search ........................... 414/409, 422, 414/595, 598, 600, 420, 814, 423, 424, 810, 811; 254/3 R, 3 C, 4 R, 4 C, 7 R, 7 C

(56) References Cited

U.S. PATENT DOCUMENTS

| 1,617,820 A | 2/1927 | Mortag |
| 3,279,635 A | 10/1966 | Avery et al. |
| 3,784,033 A | 1/1974 | Kaiser et al. |
| 3,942,663 A * | 3/1976 | Wentzel .................. 414/421 |
| 4,669,940 A | 6/1987 | Englehardt et al. |

FOREIGN PATENT DOCUMENTS

| AT | 190452 | 7/1956 |
| AU | 241226 | 8/1962 |
| DE | 1235813 | 3/1967 |
| DE | 2723340 | 12/1978 |
| FR | 2567863 | 1/1986 |

OTHER PUBLICATIONS

Trough Mover, E.T.M.W. Enterprises Ltd., undated.

* cited by examiner

Primary Examiner—Eileen D. Lillis
Assistant Examiner—Charles A. Fox
(74) Attorney, Agent, or Firm—Harness, Dickey & Pierce, P.L.C.

(57) ABSTRACT

A lifting mechanism for moving a trough from a lowered position to an elevated having a pair of guide tracks operably coupled to a trough cradle by a pair of roller mechanisms. A lifting arm operably couples the trough cradle to a drive mechanism. As the trough cradle is elevated, the roller mechanisms move away from the drive mechanism and the trough cradle to rotate about a transverse axis.

20 Claims, 5 Drawing Sheets

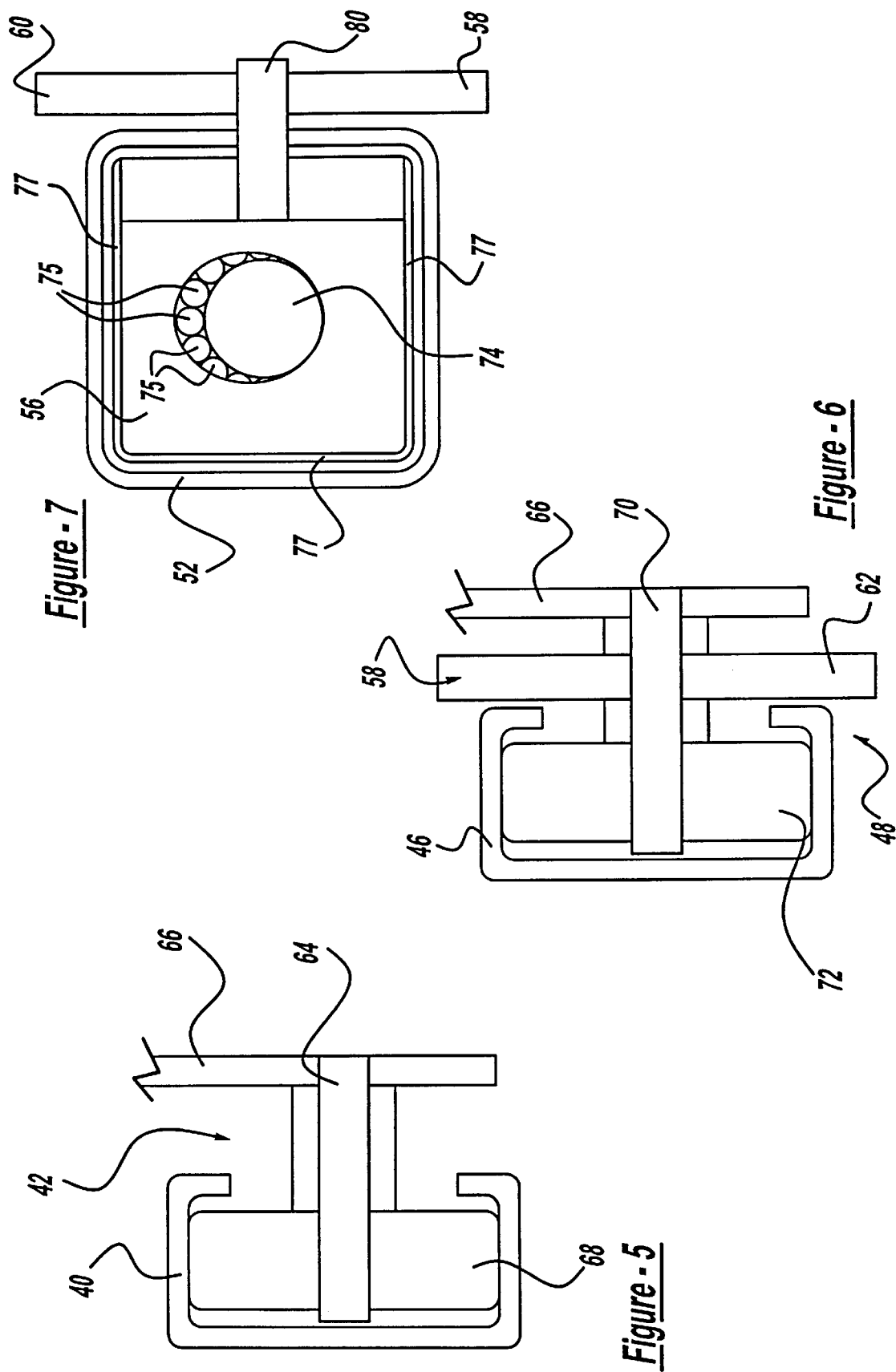

TROUGH LIFTING MECHANISM

This is a division of application Ser. No. 09/418,789 filed Oct. 15, 1999 now U.S. Pat. No. 6,238,165.

BACKGROUND AND SUMMARY OF THE INVENTION

This invention relates generally to machinery utilized in the preparation of dough for bread, pizza crust, and the like, and more particularly to a trough lifting mechanism for transferring a dough product between various apparatuses during the dough preparation process.

The preparation of various dough products requires transportation of large batches of sponge dough or final dough. For example, a sponge dough is created by measuring and mixing dry ingredients with an appropriate amount of liquid ingredients in a commercial mixer. The mixer mixes the ingredients for a prescribed duration, resulting in a sponge dough having the desirable characteristics. This sponge dough is then transported to a second mixer where the remaining ingredients are combined therewith to form a final dough product. In some instances, proofing of the dough is also required where the final dough product is placed into another trough to sit for a prescribed period of time. After proofing, the dough mass is transported for subsequent forming into the desired shape by a dough transfer hopper, an extruder, a sheeting roller or by hand shaping.

Transfer of the dough product from one processing station to another often requires lifting of the trough above the bakery floor such that the dough mass may be dumped into the hopper of the processing apparatus. Trough lifting mechanisms having typically been utilized to support and elevate the trough. The prior art lifting mechanisms convey the trough vertically upward. Near the apex of its motion, the trough is rotated downwardly to dump dough out of the trough. However, these lifting mechanisms provide no horizontal motion of the trough. As such a dough chute must be positioned below the trough to ensure that the dough is properly transferred to the processing apparatus.

Accordingly, it is a primary object of the present invention to overcome the disadvantages of the prior art and provide an improved trough lifting mechanism which efficiently transfers dough without requiring a dough chute or other device.

Another object of the present invention is to provide a trough lifting device which is capable of horizontally positioning a trough above a processing apparatus such that the dough contained therein may be dumped directly into the apparatus.

A further object of the present invention is to provide a trough lifting mechanism which reduces the equipment necessary to transport dough from one processing station to another.

In accordance with these and other objects, the present invention is directed to lifting mechanism for moving a trough from a first, lowered position to a second, raised position in which the trough cradle is also horizontally offset from the first, lowered position. The trough lifting mechanism includes a track assembly and a trough cradle operably coupled to the track assembly for positioning between the first and second positions. The track assembly includes a pair of guide tracks operably coupled to the trough cradle by a pair of roller mechanisms and a drive assembly having a drive track and a carriage supported by the drive track and positionable therealong. The trough cradle is operably coupled to the carriage by a lift arm. The drive mechanism moves the carriage along the drive track such that the lift arm manipulates the trough cradle along the pair of guide tracks. As the trough cradle moves generally vertically upwardly the trough remains substantially horizontal. Once the trough cradle, and hence the trough, has been sufficiently elevated, the trough cradle moves away from the drive track and rotates downwardly such that the top of the trough is positioned over an adjacent apparatus so that the dough product may be dumped directly therein.

Additional objects and advantages will become apparent from a reading of the following detailed description of the preferred embodiment taken in conjunction with the accompanying drawings and appended claims.

BRIEF DESCRIPTION OF THE DRAWINGS

FIG. 5 is a cross-section through a guide track subassembly taken at line V—V shown in FIG. 4;

FIG. 6 is a cross-section through a guide track subassembly taken at line VI—VI shown in FIG. 4; and FIG. 7 is a cross-section through a drive subassembly taken at line VII—VII shown in FIG. 4.

DETAILED DESCRIPTION OF THE PREFERRED EMBODIMENT

The present invention is directed to a trough lifting mechanism to be utilized during the baking process of various bread products to facilitate the transfer of dough between various apparatuses. More specifically, the trough lifting mechanism is adapted to support and elevate a large wheel bin or trough commonly used to store and transfer dough between the various processing apparatuses.

Figure 1:
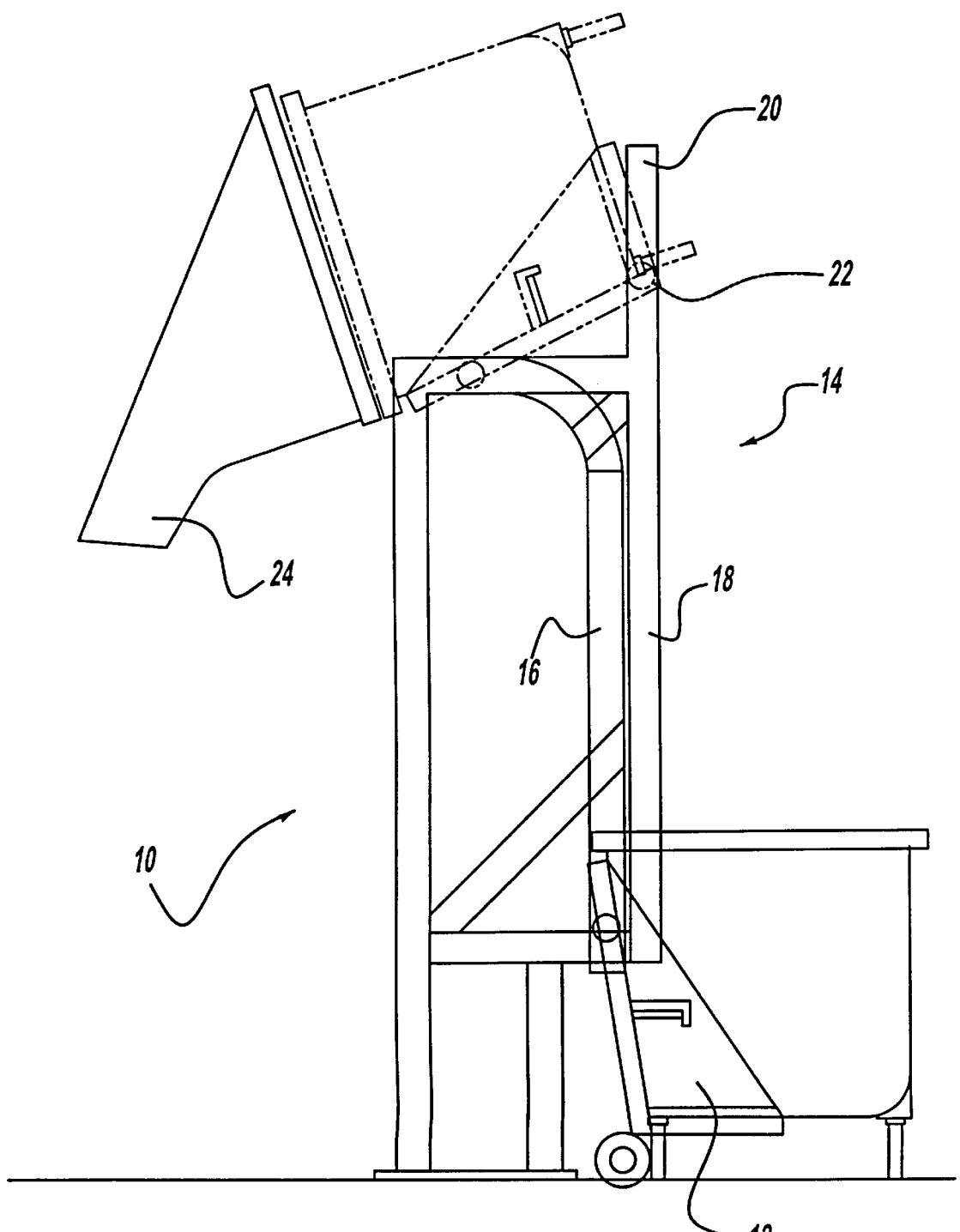
FIG. 1 is a side elevational view of a prior art trough lifting mechanism.

The lifting mechanism illustrated in FIG. 1 represents a prior art lifting mechanism 10 having a trough cradle 12 operably coupled to track assembly 14 having a guide track 16 and a drive track 18. The upper portion of trough cradle 12 is coupled to guide track 16 at pivot mechanism 20, and the lower portion of trough cradle 12 is coupled to drive track 18 at pivot mechanism 22. Drive mechanism 24 is supported in drive track 18 and is operable to position trough cradle 12 from a lowered position to a raised position. In the raised position, trough cradle 12 is pivoted downwardly about pivot mechanism 22 for dumping the dough out of the trough. The configuration of lifting mechanism 10 is such that trough cradle does not move horizontally during the lifting operation. Accordingly, chute 24 is positioned adjacent guide track 16 for directing the dough into an adjacent processing apparatus.

Figure 2:
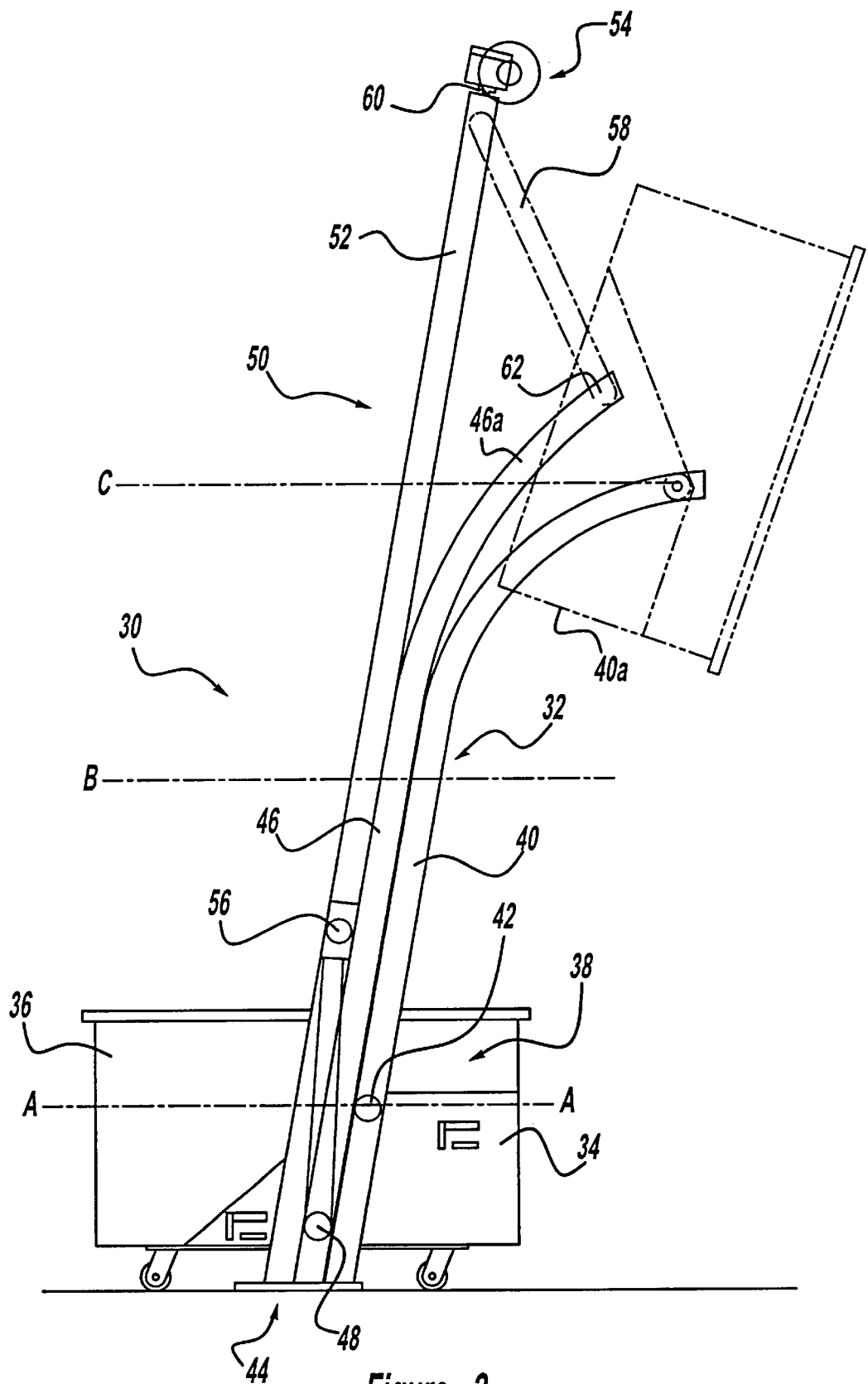
FIG. 2 is a side elevational view of a trough lifting mechanism in accordance with a preferred embodiment of the present invention.
Figure 3:
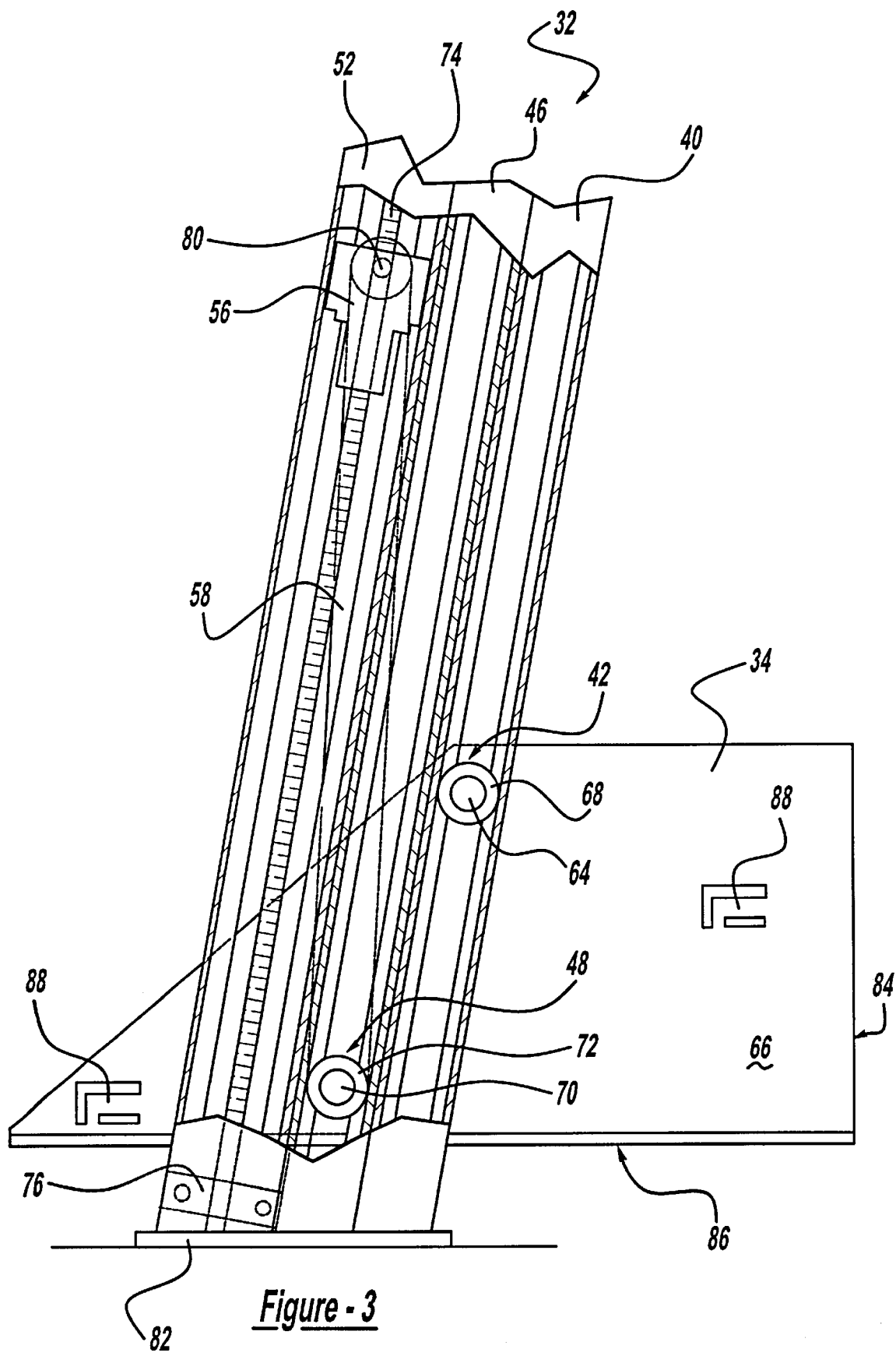
FIG. 3 is a detailed side view of the trough lifting mechanism.
Figure 4:
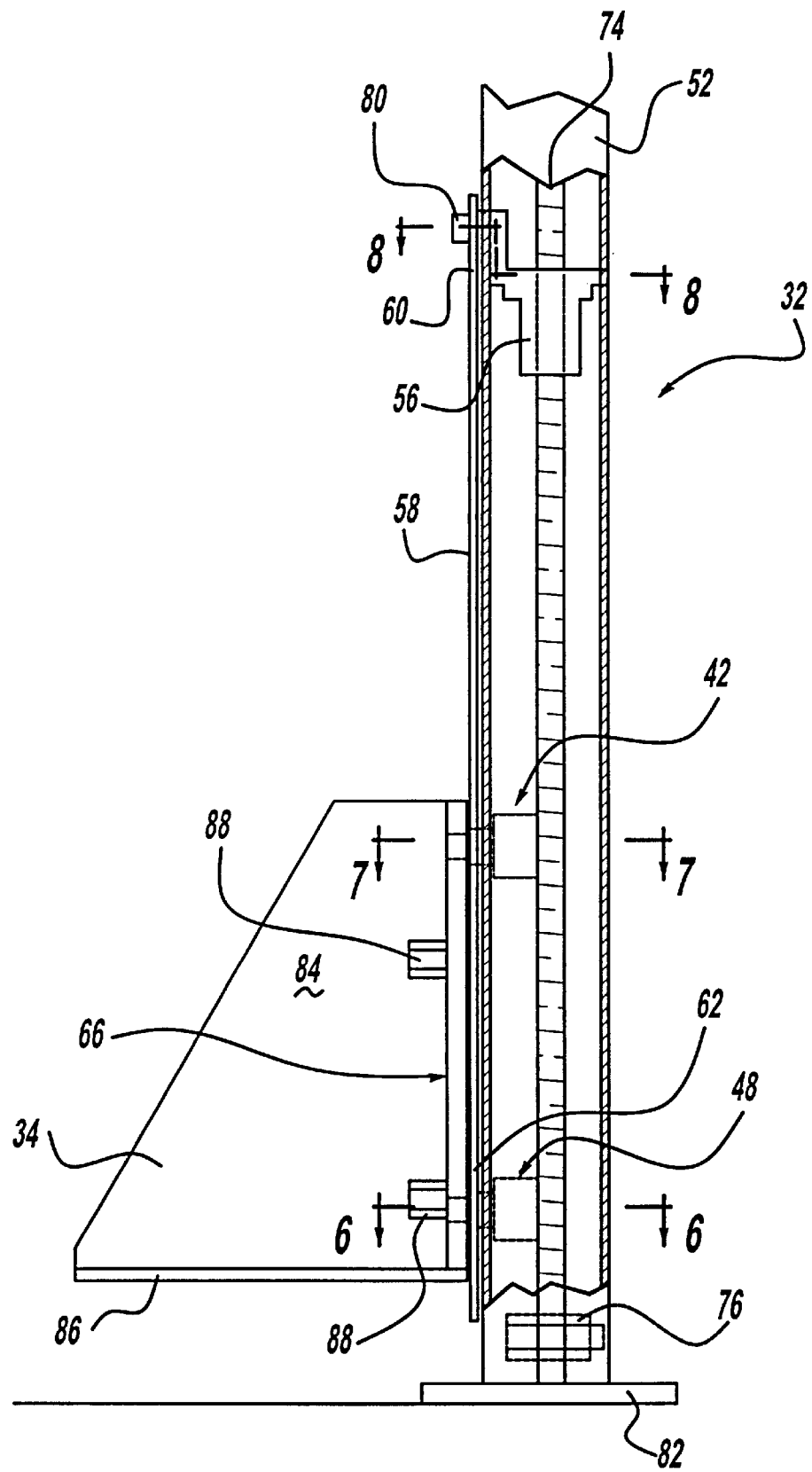
FIG. 4 is a detailed front view of the bottom portion of the trough lifting mechanism.

With reference now to FIGS. 2–4, the trough lifting mechanism of the present invention is illustrated. Trough lifting mechanism 30 includes a pair of track assemblies 32 operably coupled to a pair of trough cradles 34. Trough 36 may be placed between the track assemblies 32 on the trough cradles 34 and positioned from a lowered position to a raised position. One skilled in the art will readily recognize that the track assemblies 32 are substantially the same—one being a mirror image of the other. Accordingly, further description of the present invention will be made with reference to a single track assembly.

Track assembly 32 includes a guide track subassembly 38 having a guide track 40 operably coupled to trough cradle 34 at upper cradle roller mechanism 42 and a guide track subassembly 44 having guide track 46 pivotally coupled to trough cradle 34 at lower cradle roller mechanism 48. Track assembly 32 further includes drive track subassembly 50 having a drive track 52 operably supporting drive mechanism 54. Carriage 56 is coupled to drive mechanism 54 and axially positionable along drive track 52. Lift arm 58 is operably coupled between carriage 56 and roller mechanism 48 for manipulating trough cradle 34 between its lowered position and its raised position. As best illustrated in the phantom lines of FIG. 2, an upper end portion 60 of lift arm 58 is pivotally coupled to carriage 56, and a lower end portion 62 of lift arm 58 is pivotally coupled to roller mechanism 48.

One skilled in the art will readily recognize that the geometric configuration of guide tracks 40, 46 and drive track 52, as well as the kinematic relationship therebetween define the path of movement for trough cradle 34. As presently preferred, guide track 40 has an upper portion 40a which curves approximately seventy-five degrees (75°). Similarly, guide track 46 has an upper portion 46a which curves approximately forty-five degrees (45°). Guide track 46 is interdisposed between guide track 40 and drive track 52 to divide the angle formed therebetween. Trough cradle 34, and hence trough 36, initially moves in a generally vertical direction for raising trough 36. During this vertical movement trough 36 remains substantially horizontal such that the load contained therein is not shifted. As shown in FIG. 2, the general range of vertical movement occurs from point A to point B along lift assembly 32. Once trough cradle 34 reaches point B, track assembly 32 moves trough cradle 34 in a horizontal direction away from drive assembly 50 and rotates trough cradle 34 approximately one hundred twenty degrees (120°) in the clockwise direction to point C.

With particular reference to FIGS. 3–7, cradle roller mechanisms 42 includes a shaft 64 which is secured to a vertical side wall 66 of trough cradle 34 and extends outwardly therefrom. A roller 68 is rotatably supported on shaft 64 and received within guide track 40 having a C-shaped cross-section for operably coupling guide track subassembly 38 to trough cradle 34. Similarly, cradle roller mechanism 48 includes a shaft 70 secured to vertical side wall 60 and extends outwardly therefrom. A roller 72 is rotatably supported on shaft 70 and received within guide track 46 having a C-shaped cross-section for operably coupling guide track subassembly 44 to trough cradle 34.

Drive mechanism 54 includes an elongated threaded rod or helical drive screw 74 extending axially within drive track 52. Bearing assemblies 76 located at the upper and lower ends of drive track 52 support drive screw 74 for rotational movement within drive track 52. Motor assembly 78 is operably coupled to drive screw 74 and includes a gear box assembly (not shown) having a 4:1 gear reduction ratio and a gear brake for providing adequate control of drive mechanism 54. Carriage 56 is rotatably supported on drive screw 74 such that rotation of drive screw 74 causes carriage 56 to move axially therealong. A plurality of stainless steel ball bearings 75 are operably disposed between carriage 56 and drive screw 74 to facilitate axial movement thereof. In a normal operating condition, carriage 56 is freely supported within drive track 52 by drive screw 74. However, in extreme loading conditions, deflection of the drive screw 74 may cause carriage 56 to rub on drive track 52. Accordingly, shims 77 made of a suitable reduced friction material such as a standard food grade plastic are interdisposed between carriage 56 and drive track 52 to prevent adverse wear to these components. A pivot shaft 80 extends laterally inwardly from carriage 56. Upper end portion 60 of lift arm 58 is pivotally coupled to pivot shaft 80. Lower end portion 62 of lift arm 58 is pivotally coupled to roller shaft 70 of lower cradle roller mechanism 48.

Guide track 40, guide track 46 and drive track 52 are cantilevered upwardly from base assembly 82 which may be secured to the bakery floor. As presently preferred, guide tracks 40, 46 and drive track 52 are secured together in an adjacent relationship, thereby enhancing the rigidity and structural integrity of track assembly 32. Track assembly 32 is oriented approximately ten degrees (10°) off vertical such that moderate horizontal displacement of tough cradle 34 is achieved with vertical movement thereof. The upper ends of guide tracks 40, 46 and drive track 52 are supported from the ceiling above in a conventional manner using angle iron or all-thread rods. In this manner, the amount of floor space required by trough lifting mechanism 30 is minimized.

Trough cradle 34 includes vertical side wall 66, vertical front wall 84 and horizontal floor portion 86 which are arranged in a manner to receive and support trough 36 therein. A plurality of self-locking mechanisms 88 are provided on vertical side wall 66 such that trough 36 is securely retained within trough cradle 34 during the lifting operation performed by trough lifting mechanism 30.

In operation, trough 36 is wheeled into position on trough cradle 34 such that locking mechanisms 88 engage to releasably secure trough 36 therein. Drive mechanism 54 is activated such that drive screw 74 rotates for moving carriage 56 axially upwardly in drive track 52. Lift arm 58 manipulates trough cradle upwardly through the path defined by guide tracks 40, 46. As trough cradle 34 reaches the upper portions 40a, 46a of guide tracks 40, 46, trough cradle 34 is manipulated horizontally away from drive track 52 and rotated in a clockwise direction approximately one hundred twenty degrees (120°) such that the opening of trough 36 is positioned directly above an adjacent apparatus so that dough may be dumped directly therein.

While the present invention has been described with particular reference to a preferred embodiment of a trough lifting mechanism which is well calculated to provide the above-stated objects and advantages, one skilled in the art will readily recognize that the present invention may be adapted to other embodiments. Furthermore, those skilled in the art will readily recognize from the foregoing discussion and accompanying drawings and claims that changes, modifications and variations can be made in the present invention without departing from the spirit and scope thereof as defined in the following claims.

We claim:

1. A trough lifting mechanism comprising:
    a trough cradle movable between a lowered position and an elevated position;
    a first guide track having a first rectilinear portion defining a central longitudinal axis therealong and a first curvilinear portion extending from said first rectilinear portion;
    a first roller mechanism extending from a wall of said trough cradle and operably coupled to said first guide track, said first roller mechanism movable along said first guide track;
    a second guide track having a second rectilinear portion and a second curvilinear portion extending from said second rectilinear portion and curving at least to a point where said second curvilinear portion intersects with said central longitudinal axis;

a second roller mechanism extending from said wall of said trough cradle and operably coupled to said second guide track, said second roller mechanism moveable along said second guide track;

a lift operably coupled to said trough cradle to move said trough cradle along a path of movement defined by said first and second guide tracks from said lowered position to said elevated position;

wherein said path of movement translates said trough cradle generally in a vertical direction substantially along said first and second rectilinear portions and translates said trough cradle generally in a vertical and horizontal direction substantially along said first and second curvilinear portions; and wherein said path of movement rotates said trough cradle from an upright orientation to a tilted orientation along said first and second curvilinear portion.

2. The trough lifting mechanism of claim 1 wherein said second curvilinear portion has a radius of curvature which is greater than said first curvilinear portion.

3. The trough lifting mechanism of claim 2 wherein said first curvilinear portion curves approximately 75°.

4. The trough lifting mechanism of claim 3 wherein said second curvilinear portion curves approximately 45°.

5. The trough lifting mechanism of claim 1 wherein said second curvilinear portion extends from said second rectilinear portion and curves beyond said point where said second curvilinear portion intersects with said longitudinal axis.

6. The trough lifting mechanism of claim 5 wherein said second curvilinear portion curves in the same direction as said first curvilinear portion.

7. The trough lifting mechanism of claim 1 wherein said first rectilinear portion is generally coextensive with said second rectilinear portion.

8. The trough lifting mechanism of claim 1 wherein said first curvilinear portion and said second curvilinear portion are configured to rotate said trough cradle through a range of at least 100°.

9. The trough lifting mechanism of claim 8 wherein said first curvilinear portion and said second curvilinear portion are configured to rotate said trough cradle through a range of approximately 120°.

10. The trough lifting mechanism of claim 1 wherein trough cradle further comprises a vertical wall portion and a horizontal floor portion, said first and second roller mechanisms extending from said vertical wall portion.

11. The trough lifting mechanism of claim 10 wherein said second roller mechanism extends from said vertical wall portion at a location below said first roller mechanism.

12. The trough lifting mechanism of claim 10 wherein said trough cradle further comprises a locking mechanism adapted to releasably secure a trough therein.

13. The trough lifting mechanism of claim 1 further comprising a lifting arm having a first end pivotally coupled to said lift and a second end pivotally coupled to said trough cradle.

14. The trough lifting mechanism of claim 13 wherein said lift further comprises a helical drive screw and a carriage rotatably supported on said drive screw such that rotation of said drive screw causes said carriage to move axially therealong, said carriage being pivotally coupled to said lift arm.

15. The trough lifting mechanism of claim 14 wherein said lift further comprises a motor operably coupled to said drive screw to provide rotation thereof.

16. The trough lifting mechanism of claim 1 wherein each of said first and second roller mechanisms further comprise an axle shaft extending from said wall of said trough cradle and a roller rotatably supported on said axle shaft and received within said guide track for operably coupling said trough cradle to said guide track.

17. The trough lifting mechanism of claim 1 wherein said rectilinear portions of said first and second guide tracks are secured together in an adjacent relationship.

18. A trough lifting mechanism comprising:

a trough cradle movable between a lowered position and an elevated position;

a first guide track having a first rectilinear portion defining a central longitudinal axis therealong and a first curvilinear portion extending from said first rectilinear portion;

a first roller mechanism extending from a wall of said trough cradle and operably coupled to said first guide track, said first roller mechanism movable along said first guide track;

a second guide track secured adjacent to said first guide track, said second guide track having a second rectilinear portion co-extensive with said first rectilinear portion and a second curvilinear portion extending from said second rectilinear portion and curving at least to a point where said second curvilinear portion intersects with said central longitudinal axis;

a second roller mechanism extending from said wall of said trough cradle and operably coupled to said second guide track, said second roller mechanism moveable along said second guide track;

a lift operably coupled to said trough cradle to move said trough cradle along a path of movement defined by said first and second guide tracks from said lowered position to said elevated position;

wherein said path of movement translates said trough cradle generally in a vertical direction substantially along said first and second rectilinear and translates said trough cradle generally in a vertical and horizontal direction substantially along said first and second curvilinear portion; and wherein said path of movement rotates said trough cradle from an upright orientation to a tilted orientation along said first and second curvilinear portion.

19. The trough lifting mechanism of claim 18, wherein said second curvilinear portion extends from said second rectilinear portion and curves beyond said point where said second curvilinear portion intersects with said longitudinal axis.

20. The trough lifting mechanism of claim 19, wherein said second curvilinear portion curves in the same direction as said first curvilinear portion.

* * * * *

UNITED STATES PATENT AND TRADEMARK OFFICE
CERTIFICATE OF CORRECTION

PATENT NO. : 6,663,336 B2
DATED : December 16, 2003
INVENTOR(S) : Jack Fletcher, Donald Boyd and Micheal Hayden It is certified that error appears in the above-identified patent and that said Letters Patent is hereby corrected as shown below:

Title page,
Item [63], Related U.S. Application Data, "Continuation" should be -- Divisional --.
Item [57], ABSTRACT, after "elevated" insert -- position --.

Column 1,
Line 33, "having" should be -- have --.
Line 56, after "to" insert -- a --.

Column 3,
Line 40, "mechanisms" should be -- mechanism --.

Column 5,
Line 48, after "wherein" insert -- said --.

Column 6,
Line 47, after "rectilinear" insert -- portions --.

Signed and Sealed this

Thirtieth Day of March, 2004

JON W. DUDAS
*Acting Director of the United States Patent and Trademark Office*